3,451,574
LOAD CARRYING VEHICLE HAVING DRIVING
ENGINE LOCATED WITH A PORTION EXTEND-
ING INTO THE LOADING SPACE
Ernst Weichel, Bahnhofstrasse 1, Heiningen,
Kreis Goppingen, Germany
Filed Feb. 20, 1967, Ser. No. 617,395
Int. Cl. B60p 1/36; B62d 39/00
U.S. Cl. 214—519                                                10 Claims

ABSTRACT OF THE DISCLOSURE

Two embodiments of a self-loading vehicle are described. The load bearing vehicles are of a type which are used for agricultural purposes and include a truck body having a rear loading portion and a forward cab in which the driver or operator sits. The vehicle is supported on a plurality of longitudinally spaced axles, at least one of which is driven.

The invention provides an improved location for the driving engine which is located adjacent the floor of the load carrying portion and with a portion thereof projecting into the loading space. In the preferred arrangement of the invention, the engine is mounted so that its driving axis and crank shaft extend transverse to the longitudinal axis of the vehicle, and it is preferably positioned adjacent one end of the loading space.

A further feature of the inventive arrangement is that means for automatically loading the vehicle are located adjacent the forward end of the loading space immediately behind the operator's cab. The loading or hauling apparatus provides means for feeding the load material, for example harvested vegetables, upwardly into the loading space. The engine is located so that feeding can proceed over the top of the engine to a scraper bottom mechanism which feeds the material backwardly to the rear of the loading portion of the vehicle. The engine is advantageously provided with a curved cover for this purpose which may be removed from access to the engine, if desired.

In the one embodiment of the invention, the engine is arranged to drive through a chain sprocket to a distributor gear which is centrally located between two longitudinally spaced driving axles, one positioned ahead of the distributor gear adjacent the engine and the other positioned toward the rear of the vehicle. The distributing gear is connected to drive each axle through universally mounted shafts.

In accordance with the other embodiment, the engine is arranged to drive the distributor gear which is located between the driving axles through a universally mounted shaft instead of through a chain and sprocket arrangement.

Brief summary of the invention

The invention relates in general to the construction of vehicles which are adapted to carry loads and in particular to a new and useful automatic loading vehicle which includes a driving motor for driving at least one axle of the vehicle which is arranged to extend at least partially into the loading space.

An automatic loader where one of several axles is driven by a motor through a transmission and a differential gear is already known. In the known embodiments, the motor is arranged underneath the loading surface. The arrangement of the motor underneath the loading surface has various disadvantages; the height of the platform becomes too great and the ground clearance is too small. In addition, most of the installations where the engine is below the loading space are inaccessible so that maintenance operations and particularly the periodically required adjusting operations are extremely difficult to carry out.

In accordance with the present invention there is provided a load vehicle arrangement which includes an engine which is mounted adjacent the floor of the load space toward one end thereof in a manner such that at least the upper portion projects upwardly into the loading space. In the preferred arrangement, the axis of rotation of the crankshaft of the motor is arranged transversely to the longitudinal axis of the vehicle. This is also true of the axis of the transmission gears or clutches connected with the motor. Such an arrangement of the motor has the advantage that the upper part of the motor is readily accessible from the loading space. A further advantage is that the overall height of the vehicle can be substantially reduced while the ground clearance may be increased.

In accordance with a further feature of the invention, a covering is applied over the motor spaced from the rear wall of the loading space in a position alongside a loading or hauling duct arranged at the rear wall. The motor cover provides an inward feeding extension for the hauling duct over the motor. In the preferred arrangement, the covering is hinged so that it may be easily opened for access to the motor. In the preferred arrangement, a differential or distributing gear is located in the center of the vehicle between two longitudinally spaced axles either one or both of which may be easily driven from the distributor gear. In one embodiment the transmission is from the motor to the gears by means of a chain or belt and in the other embodiment the transmission from the motor to the distributor gear is through a universal shaft. The axles are driven from the distributor gear through universally mounted shafts and the resultant arrangement permits good cross-country mobility and relatively small angular movements of such shafts. The arrangement also provides a favorable centering of the heavy parts in respect to the center of gravity of the vehicle and the center of gravity will be located next to and behind the driven front axle.

Accordingly it is an object of the invention to provide an improved load carrying vehicle having an engine mounted so that a portion thereof extends into the loading space.

A further object of the invention is to provide a load carrying vehicle particularly one of the self-loading type which includes an engine mounted such that the upper portion thereof projects into the loading space and is adjacent an infeed duct which is operated for delivering materials to be loaded into the truck upwardly into the loading space, the engine being provided with a cover for the feeding of the material over the cover of the engine, and wherein the vehicle includes at least one driving axle which is located subjacent the motor and driven from a distributing gear which is located substantially centrally in respect to the load portion of the vehicle and arranged for driving the driving axle through a universally mounted shaft.

A further object of the invention is to provide a self-loading vehicle which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Detailed description

Figure 1:
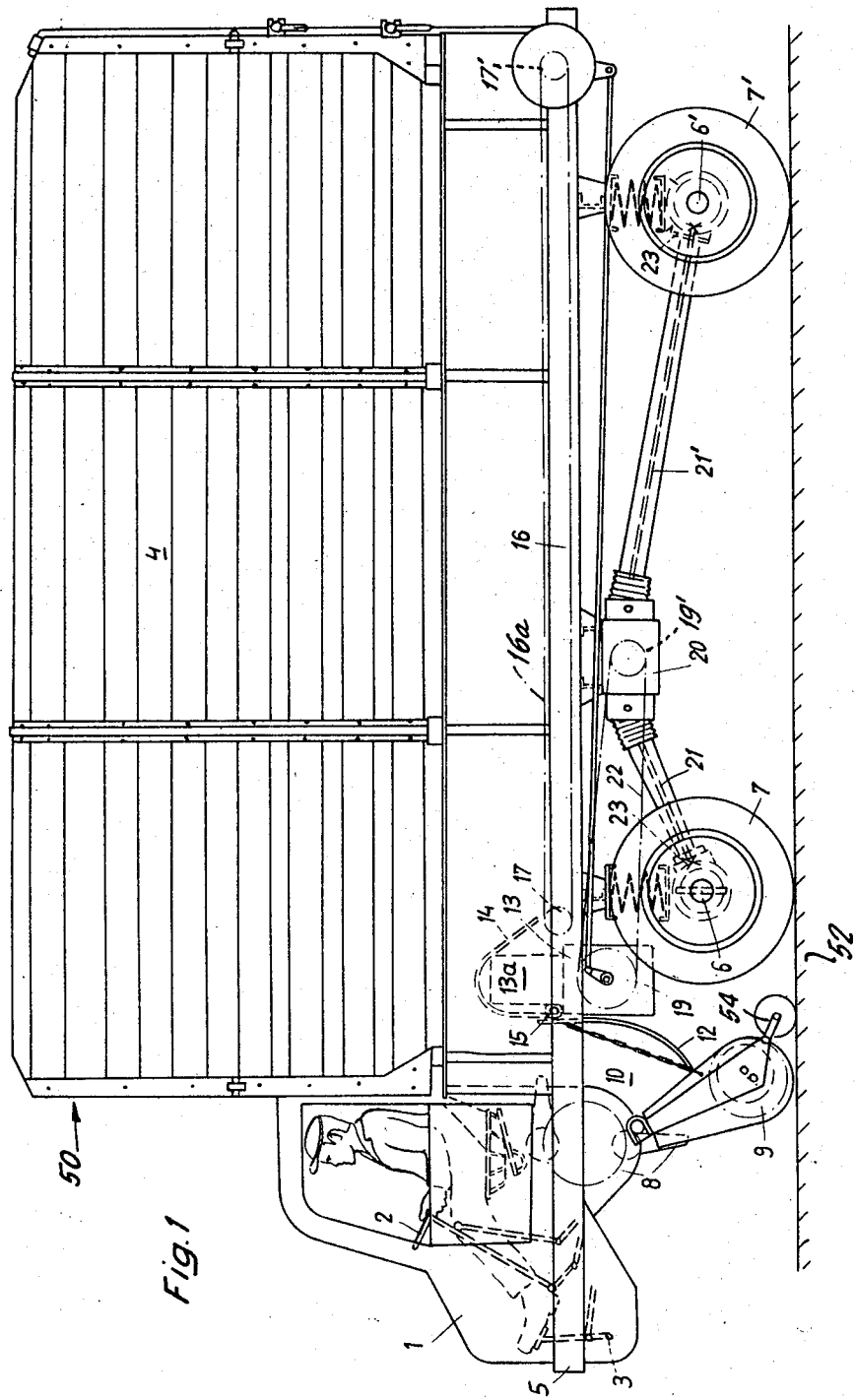
FIG. 1 is a side elevational view of a vehicle constructed in accordance with the invention.
Figure 2:
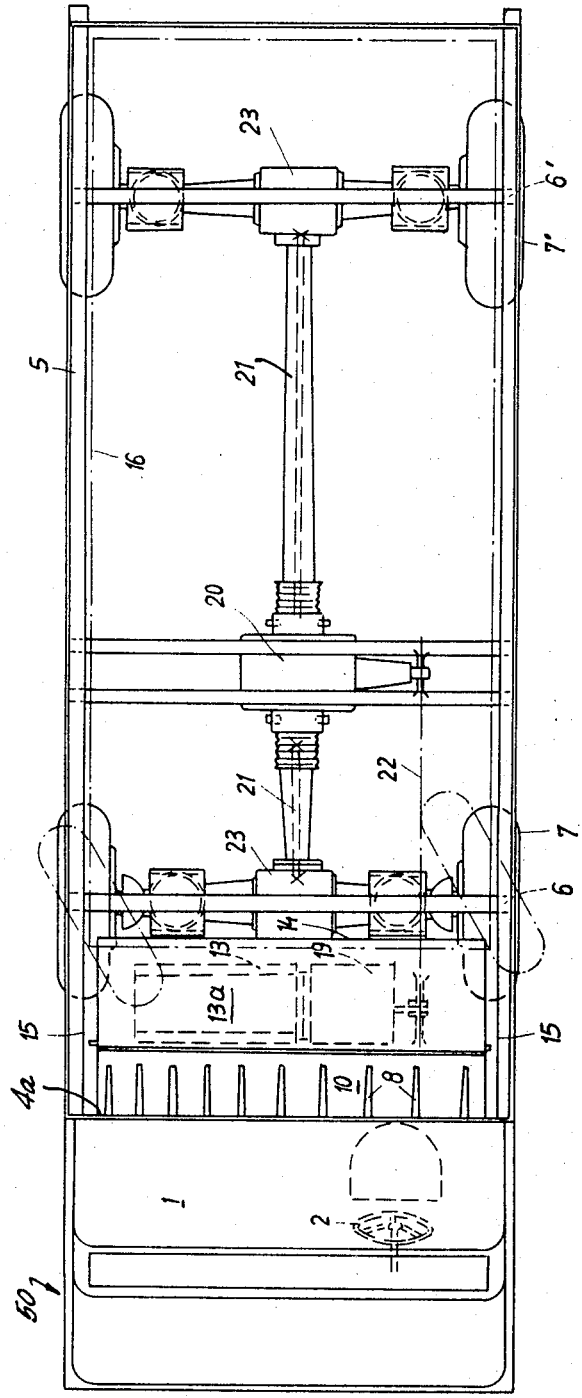
FIG. 2 is a top plan view of the vehicle of FIG. 1.

Referring to the drawings in particular, the invention embodied therein as indicated in FIGS. 1 and 2 comprises a self-loading vehicle generally designated 50 which in the embodiment illustrated comprises a truck with cross-country mobility. A driver's cabin 1 is arranged in the forward portion of the vehicle and it is provided with the usual operating equipment such as a steering wheel 2 and the pedals 3. Adjoining the driver's cabin 1 is a loading space which extends to the rear of the vehicle. The driver's cabin and the loading spaces are carried by a frame 5. The frame 5 is supported by the usual axle resilient mountings on axles 6 and 6' which are arranged at longitudinally spaced locations below the loading space 4 and rotatably support a front wheel set 7 and a rear wheel set 7'. A hauling or self-loading device 8 is pivotally suspended from the bottom of the cab 1 and it is provided with a receiving drum which is oriented adjacent the ground 52 by a guide roller 54. The loading material to be picked up from the ground is fed to the receiving drum 9 and brought by the hauling installation 8 upwardly through a hauling duct 10 and into the loading space 4. The hauling duct is defined by a curved wall 12 which terminates at a spaced location behind a forward wall 4a of the loading space.

In accordance with the invention, a driving motor 13 is mounted directly behind the curved wall 12 of the loading duct and in a position such that its axis extends transverse to the longitudinal axis of the vehicle. The motor 13 is suspended in the chassis so that the upper portion 13a protrudes into one loading space 4. This upper portion 13a is covered by a cover 14 which is advantageously hinged at 15 so that it may be easily arranged for access to the engine when desired. The cover 14 is curved so that it provides a contitnuation of the rear wall 12 of the hauling duct 10 which is also hinged at 15.

Directly behind the motor, in the loading space there is provided a scraper bottom generally designated 16 which comprises a well-known endless chain 16a which is continuously moved over pulleys or sprockets 17 and 17'. One or both of the sprockets 17 and 17' are driven from the motor by means which are not fully described herein and which do not form a part of the present invention. The scraper bottom 16 operates to advance materials which are fed up through the duct 10 and over the motor to a position in which they are delivered rearwardly of the loading space 4 as the loading progresses.

In accordance with a further feature of the invention, the wheel sets 7 and 7' are driven by the motor 13 through sprockets or chain gears 19 and 19', a distributor gear 20 and then through separate cardan or universal shafts 21 and 21'. In the embodiment of FIGS. 1 and 2, the power is transmitted from the motor 13 and the sprockets 19, 19' through a chain 22. The driving motor 13, the driving sprockets 19 and 19', the distributor gear 20 and an infinitely variable reduction gear (not shown) are arranged in such a way that the center of gravity of the vehicle is substantially over or shortly behind the front axle 6.

Figure 3:
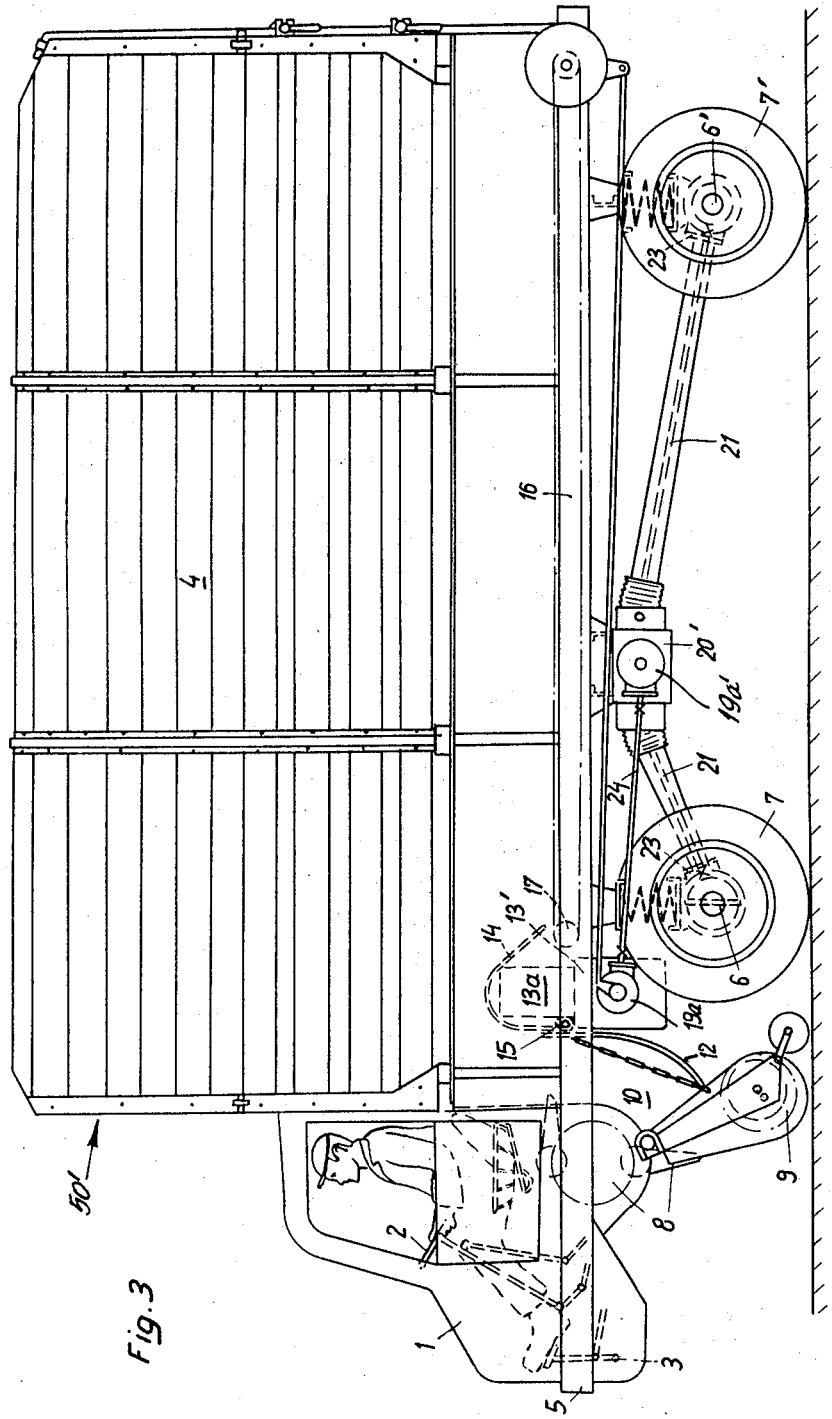
FIG. 3 is a side elevational view similar to FIG. 1 of another embodiment of the invention.
Figure 4:
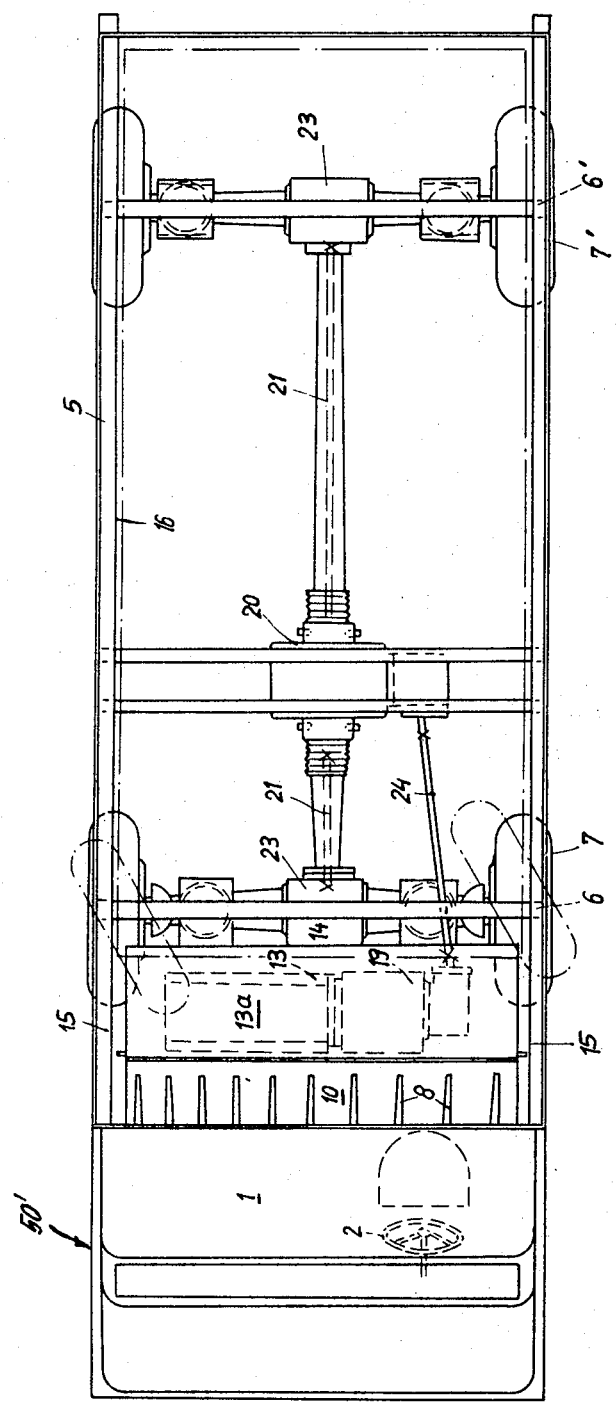
FIG. 4 is a top plan view of the embodiment of FIG. 3.

In the embodiment indicated in FIGS. 3 and 4, there is disclosed a vehicle generally designated 50' which is similar to the vehicle 50 of the first embodiment but which comprises a drive from gearing 19a on the motor 13' to gearing 19a' of the distributor gear 20' through a universal or cardan shaft 24. The other parts as shown in the embodiment of FIGS. 3 and 4 are identical with those indicated in the first embodiment and they have been similarly designated.

While specific embodiments of the invention have been shown and described in detail to illustrate the application of the inventive principles, it will be understood that the invention may be embodied otherwise without departing from such principles.

What is claimed is:

1. A load carrying vehicle comprising a vehicle frame including a forward operator's portion and a loading space behind the operator's portion, a plurality of longitudinally spaced wheeled axles supporting said frame for movement along the ground, a driving motor for at least one of said axles mounted on said frame adjacent the forward end of the loading space and having at least a portion projecting into said loading space, drive means connected between said driving motor and at least one of said axles, and hauling means for picking up and loading products from the ground as the truck is moved thereover and delivering them upwardly over said motor into the loading space, said hauling means being located directly in front of said motor.

2. A load carrying vehicle according to claim 1, wherein said driving motor is mounted so that its axis of rotation of its crankshaft extends transversely to the longitudinal axis of the vehicle.

3. A load carrying vehicle according to claim 1, including a distributor gear centrally located on said frame, said drive means including a driving connection between said motor and said distributor gear and said distributor gear and at least one of said axles.

4. A load carrying vehicle according to claim 1, including a distributor gear substantially centrally located in respect to said frame, a universal shaft connected from said distributor gear to at least one of said axles for rotating said axles, and belt means connected between said motor and said distributor gear for driving said distributor gear from said motor.

5. A load carrying vehicle according to claim 1, including a distributor gear located substantially centrally on said frame, said drive means including a shaft connected between said distributor gear and at least one of said axles, and chain and sprocket means disposed between said motor and said distributor gear for driving said distributor gear from said motor.

6. A load carrying vehicle according to claim 1, wherein said hauling means includes a hauling duct extending downwardly from the forward end of said loading space, and means for pivotally suspending said duct at a spaced location above the ground.

7. A load carrying vehicle comprising a vehicle frame including a forward operator's cab and a loading space behind said operator's cab, a forward axle located adjacent the forward end of said loading space, a rear axle spaced longitudinally rearwardly of said forward axle, each of said forward and rear axles having wheels for supporting said vehicle for movement over the ground, a driving motor mounted on said frame with at least a portion thereof extending upwardly into said loading space, said motor being located at a spaced location from the forward end of said loading space, means defining a hauling duct extending upwardly from above the ground to feed materials upwardly into said loading space, a cover over said motor forming a continuation of said hauling duct for the feeding of materials over said motor, a distributor gear on said body between said forward and rear axles, a driving shaft connected from said distributor gear to said forward axle, and drive means connected between said motor and said distributor gear for driving said distributor gear.

8. A load carrying vehicle according to claim 7, including a driving axle connected between said distributor gear and said rear axle for driving said rear axle.

9. A load carrying vehicle according to claim 7, including a scraper bottom disposed in said loading space adjacent the end of said motor cover for moving materials delivered over said cover backwardly in said loading space.

10. A load carrying vehicle comprising a vehicle frame including a forward operator's portion and a loading space behind the operator's portion, a plurality of longitudinally spaced wheeled axles supporting said frame for movement along the ground, a driving motor for at least one of said axles mounted on said frame adjacent the forward end of the loading space and having at least a portion projecting into said loading space, drive means connected between said driving motor and at least one of said axles, hauling means for picking up and loading products from the ground as the truck is moved thereover and delivering them upwardly into the loading space, said hauling means being located directly in front of said motor, a covering extending over said motor, said hauling means including a conveying duct wall directly in front of said motor extending downwardly toward the ground, said cover forming a continuation of said duct wall and describing a curved path of feed over the motor.

References Cited

UNITED STATES PATENTS

| | | |
|---|---|---|
| 1,240,551 | 9/1917 | Farrell. |
| 2,531,268 | 11/1950 | Herrington _____ 180—89 XR |
| 2,720,931 | 10/1955 | Thannhauser _____ 180—89 |
| 2,999,556 | 9/1961 | Horne et al. _____ 180—89 |

ALBERT J. MAKAY, *Primary Examiner.*

U.S. Cl. X.R.

56—11; 180—44, 89